Aug. 19, 1958 J. F. HOUDEK, JR 2,848,552
LOUD-SPEAKING STATION FOR AUTOMATIC TELEPHONE SYSTEMS
Filed Aug. 11, 1955
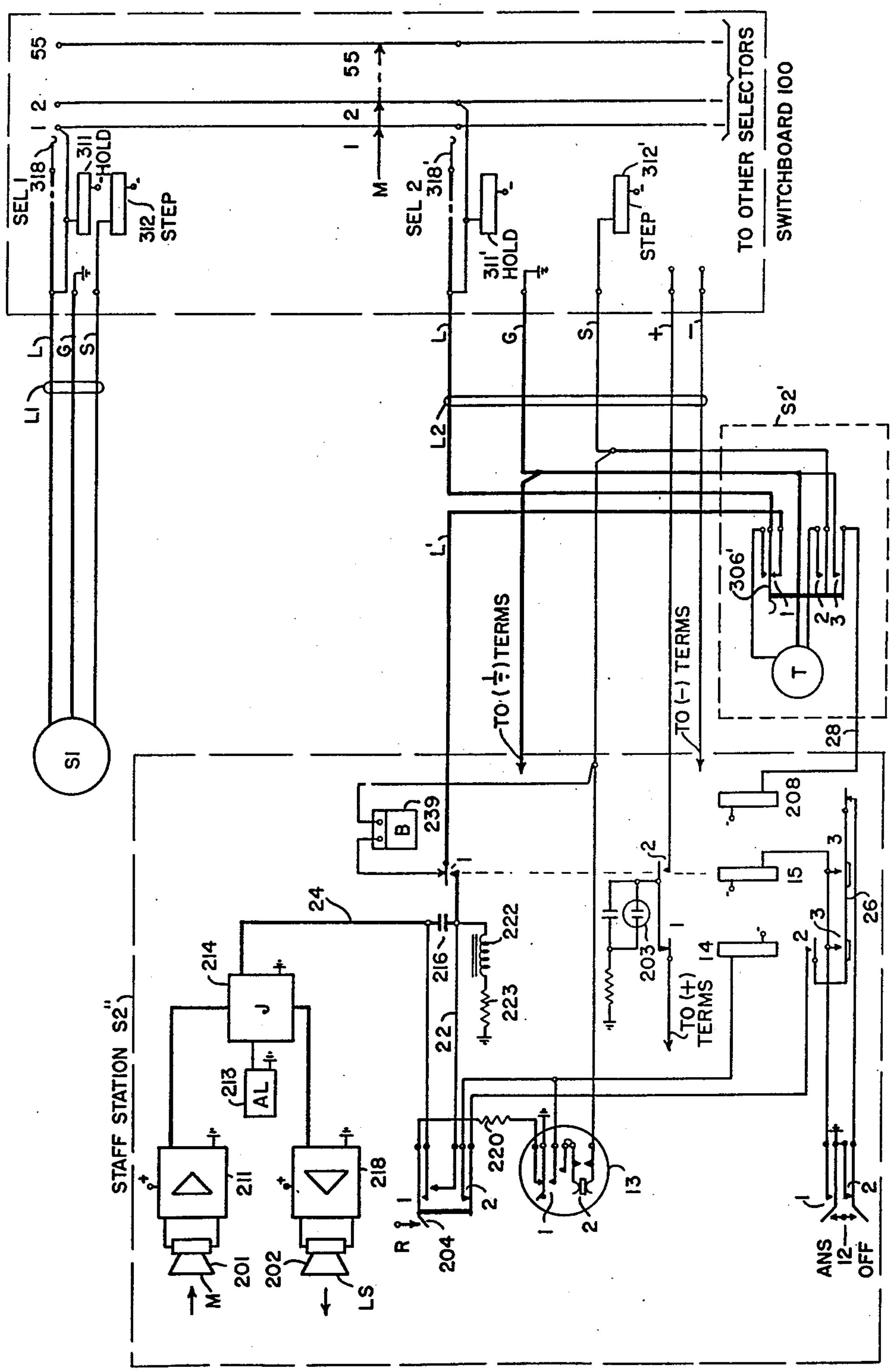

United States Patent Office 2,848,552
Patented Aug. 19, 1958

2,848,552

LOUD-SPEAKING STATION FOR AUTOMATIC TELEPHONE SYSTEMS

Joseph F. Houdek, Jr., Elmhurst, Ill., assignor to International Telephone and Telegraph Corporation, New York, N. Y., a corporation of Maryland Application August 11, 1955, Serial No. 527,694

7 Claims. (Cl. 179—81)

This invention relates to a loud-speaking station for automatic telephone systems. Its principal object is to provide an inexpensive loud-speaking telephone with a simple and effective calling and control arrangement.

Telephone stations for use with a usual automatic switching system, for establishing a connection to a called line, require an arrangement for placing a calling condition on the associated line and for transmitting impulses to operate the switches at the switchboard. The station must also provide for answering calls, and for releasing after a conversation is completed. In an ordinary telephone, the hookswitch and a dial are provided for calling and control of the connection.

A loud-speaking telephone might be equipped with a switch to supply the functions of the hookswitch, requiring that the switch be operated to place a calling condition on the line before the impulses are transmitted. Loud-speaking telephones are known in which a call may be originated with a single operation by the calling party. With such a station, pressing a pushbutton, for example, causes placing of a calling condition on the line, transmitting of the impulses, and signalling of the called line to follow automatically. Such a telephone must be equipped with an expensive and complicated calling device, including a pushbutton for each line which may be called.

According to the invention, a loud-speaking telephone station is provided with an arrangement including a dial calling device for placing a calling condition on the associated line when the dial is turned to an off-normal position.

Further, according to the invention, the calling condition established by operating the dial is maintained until released by a separate manual action.

In the preferred form of the invention, turning the dial from its normal position closes a path through off-normal contacts to operate a dial-circuit relay, which remains operated until released by operation of a separate switch.

Further, in the preferred form of the invention, the calling condition is placed on the line through contacts of a control relay which operates and locks responsive to operation of the dial-circuit relay. A ringing key is provided to signal the called line and to release the dial-circuit relay at the completion of dialing. Power is supplied to the amplifiers of the telephone only when the control relay is operated and the dial-circuit relay is released, thereby preventing amplification during dialing. Operation of a key to an answer position when a call is received causes operation of the control relay, thereby placing the station on the line and activating the amplifiers. The relays may be released and the station disconnected by operation of a key to an off position. A single switch may be actuated in one direction for answering and another direction for off.

The foregoing and other objects and features of this invention and the manner of attaining them will become more apparent, and the invention itself will be best understood, by reference to the following description of an embodiment of the invention taken in conjunction with the accompanying drawings comprising a single figure wherein the invention is applied to a loud-speaking telephone for use in a local intercommunication system.

It has been chosen to disclose this invention as embodied in a telephone station for use with the Automatic Intercommunication Telephone System disclosed in the pending United States patent application of Joseph F. Houdek, Jr., Serial No. 281,997, filed April 12, 1952. In that application, the executive station S2 shown in Fig. 2 includes loud-speaking apparatus and an automatic pushbutton calling device.

Referring to the drawing in the present application, the illustrated switchboard 100, regular telephone station S1, and privacy station S2′ correspond respectively to items 100, S1, and S2′ in the prior application. The staff station S2″ replaces executive station S2 on line L2.

When a call is made from a regular station S1 for example, by lifting the handset (not shown), a loop is closed between the L and G wires of its line L1; and when the dial (not shown) is operated, pulses are transmitted over the S wire to step the single brush 318 of its individual selector SEL–1 at switchboard 100. A metallic connection is completed by brush 318 between the L wires of the calling and called lines. The answering station closes its loop (between its L and G wires) to complete the talking connection.

Staff station S2″ is a loud-speaking station generally similar to the executive station S2 shown in Fig. 2 of the prior application, except that the pushbutton assembly 205, selector SEL–200, and the relays 236, 237, and 238 have been replaced by a conventional dial 13, an answer-off key 12, an additional set of contacts 2 on ringing key 204, a dial-circuit relay 14, and a control relay 15.

If the party at station S2 on line L2 desires to make a call, such as to station S1 on line L1, he merely dials the directory number of the desired line and then operates his ringing key to signal the called station. No manual switch operation before dialing is necessary, such as is accomplished at a regular station by lifting the handset to operate the hookswitch.

When the call is initiated by turning dial 13 from its normal position, dial circuit relay 14 operates from ground through the dial off-normal contacts 1 to its own battery-connected winding; and locks through contacts 2 of ringing key 204 and its own contacts 2 to ground normally on wire 26 through contacts of relay 208 and contacts 2 of key 12. Relay 14 at its contacts 1 opens a point in the plus lead to withhold power from the amplifiers, and at its contacts 3 closes a circuit from the battery-connected winding of control relay 15 to ground on wire 26.

Relay 15 operates and locks to ground through its contacts 3. Its contacts 2 in the plus wire close, lighting signal lamp 203 to indicate that the station is in use. At its contacts 1, ground potential is extended through resistor 223 and coil 222 to line conductor L′, and thence through hookswitch 306′ of station S2′ to wire L, and the battery-connected winding of hold magnet 311′ of selector unit SEL–2. A guarding ground potential is applied to the associated multiple conductor M2 of the switchboard, and the selector SEL–2 is prepared for stepping. Buzzer 239 is also disconnected from wire L′ by relay 15.

The off-normal contacts 1 of dial 13 disconnect ground from the contacts 1 of ringing key 204 during dialing.

On the usual return movement of dial 13, its normally open impulse-generating contacts 2 close momentarily a number of times depending on the value of the digit dialed. On each closure of contacts 2 of dial 13, an impulse is transmitted from ground through the off-normal contacts 1, over conductor S to the battery-connected winding of stepping magnet 312'. Brush 318' is stepped, once for each impulse, to the switchboard multiple wire corresponding to the digit dialed. Since line L1 is being called, brush 318' is stepped to multiple M1, and the connection is completed to line L1.

After the dialing is completed, ringing key 204 is operated to extend ground through contacts 1 of dial 13, resistor 220, contacts 1 of key 204, and contacts 1 of relay 15 to wire L', causing the buzzer (not shown) at station S1 to operate, as explained in the prior application. Operation of key 204 opens its contacts 2 to remove the locking ground for dial circuit relay 14. Relay 14 releases, and at its contacts 1 completes the circuit for the plus wire, thereby supplying power to the amplifiers 211 and 218. Relay 15 remains operated through its contacts 3 to ground on wire 26.

The talking circuit is now completed to junction 214 from microphone 201 through amplifier 211 and from junction 214 through amplifier 218 to loudspeaker 202. From junction 214 the talking path extends through condenser 216, contacts 1 of relay 15, wire L', hookswitch contacts 306' of station S2, wire L, brush 318', multiple M1, wire L of line L1 to station S1 and thence over wire G of line L1 to ground at switchboard 100, and over wire G of line L2 to ground terminals of the amplifiers and junction of station S2. Balance is obtained by artificial line 213 connected to junction 214.

To release the call, key 12 is operated downward to the off-position, opening the contacts 2 to remove holding ground from relay 15, and also from relay 14 if it is operated. Release of relay 15 disconnects, at its contacts 1, wire L' from ground through coil 222 and resistor 223, releasing hold magnet 311' of selector SEL-2. Buzzer 239 is connected to wire L'. At contacts 2 of relay 15, power is removed from amplifiers 211 and 218, and from indicator lamp 203.

When a call is received at loud-speaking station S2, as indicated by operation of buzzer 239, the party at the station operates key 12 upward to the answer position. Control relay 15 operates from ground through contacts 1 of key 12, and locks through its own contacts 3 to ground on wire 26. At contacts 1 of relay 15, buzzer 239 is disconnected, and connection is made from wire L' to holding ground through coil 222 and resistor 223, and to the talking connection through condenser 216. At contacts 2 of relay 15 power from the plus wire is supplied to indicating lamp 203, and is extended through contacts 1 of relay 14 to amplifiers 211 and 218. The station is then ready for talking. At the completion of the call the connection is released by operating the key 12 to the off-position.

As noted in the prior application, a connection is held until the last party disconnects; which enables conference calls to be conducted, and privacy handset calls to be transferred.

Transfer of calls between loud-speaking station S2'' and privacy station S2' is similar to the operation described in section IIC of the prior application. A call at staff station S2'' is transferred by merely lifting the receiver (not shown) from hookswitch 306' at privacy station S2'. Ground from wire G of line L2 is extended through contacts 3 of hookswitch 306' to the battery-connected winding of release relay 208. At the break contacts of relay 208, holding ground is removed from wire 26, releasing relays 14 and 15 and disconnecting station S2''.

A call at privacy station S2' is transferred by replacing the receiver (not shown) on hookswitch 306', and then operating key 12 to the answer position.

Setting up a conference connection among a number of stations is as described in section IID of the prior application. If a call has been received at staff station S2'', and the party thereat wishes to call an additional line, he merely dials the desired number and then operates ringing key 204. Control relay 15 operates when the call is received by actuating key 12 to answer. Subsequently turning dial 13 from its normal position closes the operating path for dial circuit relay 14 through off-normal contacts 1. Relay 14 locks through contacts 2 of key 204 and its own contacts 2 to ground on wire 26, and at its contacts 1 removes power from the amplifiers. When ringing key 204 is operated to signal the called station, relay 14 releases upon the opening of the locking path at contacts 2 of key 204. Relay 15 remains operated, and power is again extended to the amplifiers through contacts 2 of relay 15 and contacts 1 of relay 14.

It may be noted that indicating lamp 203 is lighted whenever staff station S2'' is in use, while power is withheld from the amplifiers during dialing.

While I have described above the principles of my invention in connection with specific apparatus, it is to be clearly understood that this description is made only by way of example and not as a limitation to the scope of my invention.

I claim:

1. In a telephone station for use on a line of an automatic switching system, voice-current transmitting and receiving apparatus and means for operatively coupling it to the line, an impulse-sending device movable from and returnable to a normal position to generate a series of impulses for transmission over the line, relay means and means for actuating it responsive to the moving of the impulse-sending device out of its normal position, the relay means including contact means for imposing a calling condition on the said line before the said impulse generation occurs to thereby prepare for the effective transmission over the line of the generated impulses, the said means for operatively coupling apparatus to the line including contact means of the relay means, means for locking the said relay means to maintain it actuated after the said impulse-sending device has returned to its normal position, means for releasing the relay means to terminate the calling condition, a key having a normal position and two operated positions, means responsive to operation of the key to one said operated position for operating and locking the said relay means to operatively couple the said voice-current transmitting and receiving apparatus to the said line to receive a call, and means responsive to operation of the key to the other said operated position for actuating the said means for releasing the relay means.

2. In a telephone station for use on a line of an automatic switching system, voice-current transmitting and receiving apparatus and amplifiers associated therewith having an operative condition and an inoperative condition, an impulse-sending device movable from and returnable to a normal position to send a series of impulses, contacts associated with the impulse-sending device, a first and a second relay, means responsive to the moving of said impulse-sending device out of its normal position for actuating its associated contacts and for thereby operating both said relays, means for locking both relays, the amplifiers being in the inoperative condition with both relays operated, means responsive to the operation of the second relay for imposing a calling condition on the said line, means effective after the said contacts have been actuated for sending over the said line switch-control impulses from the impulse-sending device, first key means for releasing the first relay, means responsive to release of the first relay while the second relay remains operated for placing the amplifiers in the operative condition and operatively coupling the transmitting and receiving apparatus to the said line.

3. In a telephone station according to claim 2, second key means for operating the said second relay to place the said amplifiers in the said operative condition and to operatively couple the transmitting and receiving apparatus to the said line to receive a call, and third key means for releasing operated ones of said relays to effectively disconnect the said station from the said line and to place the amplifiers in the inoperative condition.

4. In a telephone station according to claim 3, means responsive to the moving of the said impulse-sending device out of its normal position while the said station is in use, with the said second relay operated, for actuating the said associated contacts to thereby operate the said first relay, means responsive to operation of the first relay for placing the said amplifiers in the said inoperative condition, and means for sending over the said line switch-control impulses from the impulse-sending device to establish a connection to an additional line.

5. In a telephone station according to claim 2, means for placing a signalling condition on the said line responsive to operation of the said first key means.

6. In a telephone station for use on a line of an automatic switching system, voice-current transmitting and receiving apparatus and means for operatively connecting it to the line to place the station in use and for disconnecting it from the line to return the station to a normal idle condition, a calling device movable from and returnable to a normal position to transmit impulses over the line to select a called line, a relay and means for operating it responsive to the movement of the calling device, the relay having contact means for closing a self-locking circuit for the relay and for disabling the receiving apparatus while the impulses are being sent, a manually operable ringing device at the station including first contacts for imposing a condition on the associated line adapted to cause a call signal to be sent over the calling line, and second contacts included in the ringing means for unlocking and restoring the said relay.

7. In a telephone station according to claim 6, means controlled by the calling device for maintaining the said first contact means ineffective to cause the said call signal to be sent until the calling device has returned to its said normal position.

References Cited in the file of this patent

UNITED STATES PATENTS

| | | |
|---|---|---|
| 1,306,829 | Mellinger | June 17, 1919 |
| 2,424,423 | Tschumi | July 22, 1947 |